United States Patent
Cui et al.

(10) Patent No.: US 11,225,587 B2
(45) Date of Patent: Jan. 18, 2022

(54) AQUEOUS COATING COMPOSITION

(71) Applicants: Dow Global Technologies LLC, Midland, MI (US); Rohm and Haas Company, Collegeville, PA (US)

(72) Inventors: Longlan Cui, Shanghai (CN); Junyu Chen, Shanghai (CN); Tao Wang, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 196 days.

(21) Appl. No.: 16/348,271

(22) PCT Filed: Dec. 19, 2016

(86) PCT No.: PCT/CN2016/110713
§ 371 (c)(1),
(2) Date: May 8, 2019

(87) PCT Pub. No.: WO2018/112691
PCT Pub. Date: Jun. 28, 2018

(65) Prior Publication Data
US 2019/0315997 A1    Oct. 17, 2019

(51) Int. Cl.
| | | |
|---|---|---|
| *C09D 143/02* | (2006.01) | |
| *C08F 230/02* | (2006.01) | |
| *C08K 5/52* | (2006.01) | |
| *C08L 91/06* | (2006.01) | |
| *C09D 5/28* | (2006.01) | |
| *C08L 25/06* | (2006.01) | |
| *C08L 33/02* | (2006.01) | |
| *C08L 33/10* | (2006.01) | |

(52) U.S. Cl.
CPC .......... *C09D 143/02* (2013.01); *C08F 230/02* (2013.01); *C08K 5/52* (2013.01); *C08L 91/06* (2013.01); *C09D 5/28* (2013.01); *C08L 25/06* (2013.01); *C08L 33/02* (2013.01); *C08L 33/10* (2013.01)

(58) Field of Classification Search
CPC ....... C09D 143/02; C09D 5/28; C08F 230/02; C08L 33/02; C08L 91/06; C08K 5/52
USPC .......................................................... 524/599
See application file for complete search history.

(56) References Cited

U.S. PATENT DOCUMENTS

| | | |
|---|---|---|
| 6,555,641 B2 | 4/2003 | Parker et al. |
| 6,664,327 B2 | 12/2003 | Daisey, Jr. et al. |
| 7,318,958 B2 | 1/2008 | Wang |
| 7,459,496 B2 | 12/2008 | Hsu et al. |
| 7,767,747 B2 | 8/2010 | Lind et al. |
| 2005/0075425 A1* | 4/2005 | Bouvy ............... C08K 5/521 524/115 |
| 2007/0208129 A1 | 9/2007 | Finegan et al. |
| 2009/0176127 A1 | 7/2009 | Matthews et al. |
| 2011/0009540 A1* | 1/2011 | Terrenoire ........... C08F 230/02 524/145 |
| 2013/0035430 A1* | 2/2013 | Li ....................... C09D 5/028 524/276 |
| 2015/0259559 A1 | 9/2015 | Petrie et al. |

FOREIGN PATENT DOCUMENTS

| | | |
|---|---|---|
| AU | 2008343442 B2 | 4/2014 |
| AU | 2012216399 B2 | 6/2014 |
| CN | 101538438 A | 9/2009 |
| CN | 102212171 A | 10/2011 |
| CN | 102719166 A | 10/2012 |
| JP | 3920181 B2 | 5/2007 |
| WO | 2015061959 A1 | 5/2015 |

* cited by examiner

*Primary Examiner* — Hui H Chin
(74) *Attorney, Agent, or Firm* — Karl E. Stauss; Cantor Colburn LLP

(57) ABSTRACT

The present invention provides an aqueous coating composition that provides coatings with improved hydrophilic stain repellency.

12 Claims, No Drawings

AQUEOUS COATING COMPOSITION

FIELD OF THE INVENTION

The present invention relates to an aqueous coating composition and a method of preparing the same.

INTRODUCTION

Stain repellency, especially hydrophilic stain repellency is one of the key performance requirements for coating films. Hydrophilic stain repellency is a coating film's resistance to hydrophilic stains, including its resistance to being wetted by hydrophilic stains, its resistance to being adhered by hydrophilic stains on the coating films, and how easily hydrophilic stains can be removed.

In the coating industry, one of the commonly used and highly effective additives to repel hydrophilic stains is wax. Wax tends to migrate to the surface of dry coating films and reduces the surface tension, thereby improving stain repellency. US 2013/0035430 A1 relates to an aqueous coating composition having a fraction of critical pigment volume concentration of from 35% to 110%, and comprising: (i) pigment composition, including 15 wt. %-100 wt. %, in percentage by weight based on the dry weight of the pigment composition, polymer-encapsulated pigment; and 0-85 wt. %, in percentage by weight based on the dry weight of the pigment composition, un-encapsulated pigment; and (ii) 0.01 wt. %-5 wt. %, in percentage by dry weight based on the wet weight of the aqueous coating composition, at least one paraffin wax emulsion. However, when pigment volume concentration (PVC) of such coating composition increased to 55% or more, the hydrophilic stain repellency of coating films needs to be further improved. To compensate for the poor hydrophilic stain repellency effect caused by pigments, more wax need to be added into the coating composition, which would result in additional cost and even compromise other performances of coating films, such as gloss, washability, and freeze-thaw stability.

It is therefore desired to provide an aqueous coating composition with a wide range of PVC that can provide coating films made therefrom with desired hydrophilic stain repellency without having to increase the amount of wax content.

SUMMARY OF THE INVENTION

The present invention provides a novel aqueous coating composition comprising an emulsion polymer prepared by polymerization of at least two types of phosphorous-containing monomers at a specific ratio, a wax emulsion, and a pigment. The aqueous coating composition, even with a high PVC (PVC of 55% or higher), can provide coatings with good hydrophilic stain repellency as indicated by a hydrophilic stain repellency score of 7 or above, as measured by the test method described in the Examples section below.

In a first aspect, the present invention is an aqueous coating composition comprising:

(A) an emulsion polymer comprising as polymerized units, based on the dry weight of the emulsion polymer, (i) from 1.9% to 3.5% by weight of phosphorous-containing monomers, wherein the phosphorous-containing monomers comprise, (a) a phosphorous-containing (meth)acrylate, and (b) a phosphorous-containing surfactant or a salt thereof, wherein the phosphorous-containing surfactant has the structure of formula (I),

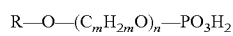

(I), wherein R is a $C_8$-$C_{22}$ branched or linear alkenyl group, m is an integer of from 2 to 4, and n is an integer of from 3 to 40; and wherein the weight ratio of phosphorous-containing (meth)acrylate to total phosphorous-containing monomers is in the range of 0.1 to 0.8; and (ii) from 0 to 1% by weight of an ethylenically unsaturated ionic monomer carrying at least one functional group selected from carboxyl, carboxylic anhydride, sulphonate, phosphonate, or combinations thereof;

(B) a wax emulsion in an amount of from 1% to 10% by solids weight, based on the dry weight of the emulsion polymer; and (C) a pigment.

In a second aspect, the present invention is a method of improving hydrophilic stain repellency of a substrate. The method comprises:

forming an aqueous coating composition of the first aspect, applying the aqueous coating composition to a substrate, and drying, or allowing to dry the aqueous coating composition, wherein the coated substrate has improved hydrophilic stain repellency.

DETAILED DESCRIPTION OF THE INVENTION

"Acrylic" as used herein includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" as used herein, can be measured by various techniques including, for example, differential scanning calorimetry ("DSC") or calculation by using a Linear equation. For example, $T_g$ of an emulsion polymer comprising polymerized units of Monomers a, b, and c, is determined according to the following linear equation.

$$T_g = W_a * T_{ga} + W_b * T_{gb} + W_c * T_{gc}$$

wherein $T_{ga}$, $T_{gb}$, and $T_{gc}$ refer to $T_g$ of homopolymer of Monomer a, homopolymer of Monomer b, and homopolymer of Monomer c, respectively; and $W_a$, $W_b$, and $W_c$ refer to weight fraction of Monomer a, Monomer b, and Monomer c used for preparing the emulsion polymer, based on the weight of total monomers, respectively.

"Polymerized unit", also known as "structural unit", of the named monomer, refers to the remnant of the monomer after polymerization.

An "alkenyl" as used herein refers to an unsaturated hydrocarbon that contains at least one carbon-carbon double bond. A substituted alkenyl refers to an alkenyl wherein at least one of the hydrogens on the carbon double bond is replaced by an atom or group other than H, for example, a $C_1$-$C_{30}$ alkyl group or $C_6$-$C_{30}$ aromatic group. In case that an alkenyl contains more than one unsaturated bonds, these bonds usually are not cumulated, but may be arranged in an alternating order, such as in —[CH=CH—]$_p$, where p may be in the range of 2-50. Where not defined otherwise, preferred alkyl contains 1-22 carbon atoms; preferred alkenyl contain 2-22 carbon atoms.

The emulsion polymer useful in the present invention may comprise, as polymerized units, phosphorous-containing monomers. The phosphorous-containing monomers comprise one or more phosphorous-containing (meth)acrylates and one or more phosphorus-containing surfactants. In one embodiment, the phosphorous-containing monomers consist of one or more phosphorous-containing (meth)acrylates and one or more phosphorus-containing surfactants.

The phosphorous-containing (meth)acrylate useful in preparing the emulsion polymer can be dihydrogen phosphate esters of an alcohol in which the alcohol contains or is substituted with a polymerizable vinyl or olefinic group. Examples of suitable phosphorus-containing (meth)acrylates include phosphoalkyl (meth)acrylates such as phosphoethyl (meth)acrylate, phosphopropyl (meth)acrylate, phosphobutyl (meth)acrylate, and salts thereof; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, and salts thereof; or mixtures thereof. Preferred phosphorous-containing (meth)acrylate is a mono- or di-ester of phosphoalkyl (meth)acrylate, more preferably a mono- or di-ester of phosphoethyl methacrylate, and most preferably phosphoethyl methacrylate (PEM).

The phosphorous-containing monomers useful in the present invention also comprise one or more phosphorous-containing surfactants or salts thereof. The phosphorous-containing surfactants may have the structure of formula (I):

$$R\text{—}O\text{—}(C_mH_{2m}O)_n\text{—}PO_3H_2 \quad (I),$$

wherein R is a $C_8$-$C_{22}$, $C_9$-$C_{20}$, or $C_{10}$-$C_{18}$, branched or linear alkenyl group;

wherein m is an integer of from 2 to 4 or from 2 to 3, and more preferably 2; and wherein n is an integer of from 3 to 40, from 4 to 25, or from 5 to 15.

R in formula (I) may contain from 1 to 5 double bonds, preferably from 1 to 3 double bonds. Preferred R in formula (I) is a $C_{10}$-$C_{18}$ branched or linear alkenyl group.

Examples of suitable phosphorous-containing surfactants include unsaturated nonyl polyethoxylate phosphate ester, unsaturated nonyl polypropoxylate phosphate ester, unsaturated nonyl polyethoxylate-polypropoxylate phosphate ester, unsaturated lauryl polyethoxylate phosphate ester, unsaturated lauryl polypropoxylate phosphate ester, unsaturated lauryl polyethoxylate-polypropoxylate phosphate ester, unsaturated tetradecyl polyethoxylate phosphate ester, unsaturated tetradecyl polypropoxylate phosphate ester, unsaturated tetradecyl polyethoxylate-polypropoxylate phosphate ester, unsaturated hexadecyl polyethoxylate phosphate ester, unsaturated hexadecyl polypropoxylate phosphate ester, unsaturated hexadecyl polyethoxylate-polypropoxylate phosphate ester, unsaturated octadecyl polyethoxylate phosphate ester, unsaturated octadecyl polypropoxylate phosphate ester, unsaturated octadecyl polyethoxylate-polypropoxylate phosphate ester, unsaturated stearyl polyethoxylate phosphate ester, unsaturated stearyl polypropoxylate phosphate ester, unsaturated stearyl polyethoxylate-polypropoxylate phosphate ester, unsaturated behenyl polyethoxylate phosphate ester, unsaturated behenyl polypropoxylate phosphate ester, unsaturated behenyl polyethoxylate-polypropoxylate phosphate ester, or combinations thereof. Preferred phosphorous-containing surfactants are selected from the group consisting of unsaturated hexadecyl polyethoxylate phosphate ester, unsaturated octa- decyl polyethoxylate phosphate ester, unsaturated stearyl polyethoxylate phosphate ester, and unsaturated behenyl polyethoxylate phosphate ester. The above mentioned phosphorous-containing surfactants can be neutralized by an alkali to form the corresponding salts, that is, anionic phosphorous-containing surfactants. Suitable commercially available products include MAXEMUL 6112 and MAXEMUL 6106 surfactants both from Croda Company.

Surprisingly, it was found that the total amount of phosphorous-containing monomers and the weight ratio of phosphorous-containing (meth)acrylate to total phosphorous-containing monomers are critical to hydrophilic stain repellency of coatings made from the aqueous coating composition. For example, the emulsion polymer may comprise as polymerized units, based on the dry weight of the emulsion polymer, total phosphorous-containing monomers in an amount of 1.9% by weight or more, 2.0% by weight or more, 2.1% by weight or more, or even 2.2% by weight or more, and at the same time, 3.5% by weight or less, 3.0% by weight or less, 2.8% by weight or less, or even 2.7% by weight or less. The weight ratio of phosphorous-containing (meth)acrylate to total phosphorous-containing monomers may be in the range of from 0.1 to 0.8, from 0.2 to 0.7, from 0.3 to 0.6, or from 0.4 to 0.5. Preferably, the emulsion polymer comprises from 2.2% to 3.0% by weight or from 2.4% to 2.8% by weight of polymerized units of the phosphorous-containing monomers, wherein the weight ratio of phosphorous-containing (meth)acrylate to total phosphorous-containing monomers is in the range of from 0.4 to 0.6. In one embodiment, total phosphorous-containing monomers are the phosphorous-containing (meth)acrylate and the phosphorous-containing surfactant, thus the total amount of phosphorous-containing monomers is the combined amount of the phosphorous-containing (meth)acrylate and the phosphorous-containing surfactant.

The emulsion polymer may further comprise polymerized units of one or more ethylenically unsaturated ionic monomers carrying at least one functional group selected from carboxyl, carboxylic anhydride, sulphonate, phosphonate, or combinations thereof. "Ionic monomers" herein refer to monomers that bear an ionic charge between pH=1-14. Suitable ethylenically unsaturated ionic monomers carrying at least one functional group may include, for example, α, β-ethylenically unsaturated carboxylic acids or anhydrides thereof such as (meth)acrylic acid, itaconic acid (IA), fumaric acid, (meth)acrylic anhydride, maleic anhydride, or mixtures thereof; sodium styrene sulfonate (SSS), sodium vinyl sulfonate (SVS), 2-acrylamido-2-methylpropanesulfonic acid (AMPS), or mixtures thereof. Preferred ethylenically unsaturated ionic monomers carrying at least one functional group include sodium styrene sulfonate, sodium vinyl sulfonate, 2-acrylamido-2-methylpropanesulfonic acid, or mixtures thereof. The emulsion polymer may comprise as polymerized units, based on the dry weight of the emulsion polymer, from 0 to 1% by weight, from 0.1% to 0.8% by weight, or from 0.3% to 0.5% by weight, of the ethylenically unsaturated ionic monomer carrying at least one functional group. In one embodiment, the emulsion polymer may comprise, based on the dry weight of the emulsion polymer, less than 0.5% by weight, less than 0.1% by weight, or less than 0.05% by weight, of polymerized units of the α, β-ethylenically unsaturated carboxylic acids or anhydrides thereof.

The emulsion polymer useful in the present invention may also comprise polymerized units of one or more ethylenically unsaturated nonionic monomers. As used herein, the term "nonionic monomers" refers to monomers that do not bear an ionic charge between pH=1-14. Suitable ethylenically unsaturated nonionic monomers may include, for example, monoethylenically unsaturated nonionic monomers include alkyl esters of (methyl) acrylic acids such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, or combinations thereof; (meth)acrylonitrile; (meth)acrylamide; amino-functional and ureido-functional monomers such as hydroxyethyl ethylene urea methacrylate; monomers bearing acetoacetate-functional groups such as acetoacetoxyethyl methacrylate (AAEM); monomers bearing carbonyl-containing groups such as diacetone acrylamide (DAAM); ethylenically unsaturated monomers having a benzene ring such as styrene and substituted styrene; butadiene; α-olefins such as ethylene, propylene, and 1-decene; vinyl acetate, vinyl butyrate, vinyl versatate and other vinyl esters; glycidyl (meth)acrylate; or combinations thereof. Preferably, the ethylenically unsaturated nonionic monomers are selected from the group consisting of methyl methacrylate, ethyl acrylate, butyl acrylate, 2-ethylhexyl acrylate, and styrene. More preferably, the ethylenically unsaturated nonionic monomers comprise styrene. The emulsion polymer may comprise as polymerized units, based on the dry weight of the emulsion polymer, from 90% to 98% by weight or from 92% to 95% by weight, of the ethylenically unsaturated nonionic monomers.

In one embodiment, the emulsion polymer comprise as polymerized units, based on the dry weight of the emulsion polymer, from 1.9% to 3.5% by weight, preferably from 2.2% to 3.0% by weight, of the phosphorous-containing monomers, wherein the phosphorous-containing monomers comprise the phosphorous-containing (meth)acrylate and the phosphorous-containing surfactant at a weight ratio of phosphorous-containing (meth)acrylate to total phosphorous-containing monomers in the range of from 0.1 to 0.8, preferably from 0.4 to 0.6;

from 30% to 50% by weight of styrene;

from 50% to 70% by weight of alkyl esters of (methyl) acrylic acids such as methyl methacrylate, ethyl acrylate, butyl acrylate, 2-ethylhexyl acrylate, or mixtures thereof; and from 0.1% to 0.8% of the ethylenically unsaturated ionic monomer carrying at least one functional group.

The emulsion polymer useful in the present invention may be prepared by emulsion polymerization of the monomers described above. Total weight concentration of monomers for preparing the emulsion polymer is equal to 100%. A mixture of monomers for preparing the emulsion polymer, may be added neat or as an emulsion in water; or added in one or more additions or continuously, linearly or nonlinearly, over the reaction period of preparing the emulsion polymer. Temperature suitable for emulsion polymerization process may be lower than 100° C., in the range of from 30° C. to 95° C., or in the range of from 50° C. to 90° C.

In the polymerization process of preparing the emulsion polymer, free radical initiators may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01% to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the polymerization process of preparing the emulsion polymer, one or more additional surfactants may be used. The additional surfactants that are different from the phosphorous-containing surfactant may be added prior to or during the polymerization of the monomers, or combinations thereof. A portion of the additional surfactant can also be added after the polymerization. These additional surfactants may include anionic and/or nonionic emulsifiers. Examples of suitable additional surfactants include alkali metal or ammonium salts of alkyl, aryl, or alkylaryl sulfates, sulfonates or phosphates; alkyl sulfonic acids; sulfosuccinate salts; fatty acids; and ethoxylated alcohols or phenols. In some preferred embodiments, the alkali metal or ammonium salts of alkyl, aryl, or alkylaryl sulfates surfactant are used. The additional surfactant used is usually from 0% to 6% by weight or from 0.1% to 5%, or from 0.3% to 1.5% by weight, based on the weight of total monomers used for preparing the emulsion polymer.

In the polymerization process of preparing the emulsion polymer, a chain transfer agent may be used. Examples of suitable chain transfer agents include 3-mercaptopropionic acid, n-dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the emulsion polymer. The chain transfer agent may be used in an amount from 0 to 3% by weight, from 0.1% to 1% by weight, or from 0.05% to 0.3% by weight, based on the total weight of monomers used for preparing the emulsion polymer.

After completing the polymerization of the emulsion polymer, the obtained emulsion polymer may be neutralized by one or more bases as neutralizers to a pH value, for example, at least 6, from 6 to 10, or from 7 to 9. The bases may lead to partial or complete neutralization of the ionic or latently ionic groups of the emulsion polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The emulsion polymer useful in the present invention may have a weight average particle size of from 50 nanometers (nm) to 300 nm, from 80 nm to 200 nm, or from 90 nm to 150 nm, as measured by a Brookhaven BI-90 or 90Plus Particle Sizer.

The aqueous coating composition of the present invention may further comprise one or more wax emulsions. The wax emulsion can be polyethylene (PE) wax such as high density polyethylene (HDPE) wax, polypropylene (PP) wax, carnauba wax, paraffin wax, polyethylene acrylic acid wax, or mixtures thereof. Suitable commercially available wax emulsions include, for example, MICHEM ME 62330 paraffin/PE wax emulsion, MICHEM ME 34935 paraffin/ethylene acrylic acid wax emulsion, MICHEM 180 a blend of paraffin and carnauba wax, and MICHEM ME 71450 paraffin wax emulsion all available from Michelman Inc.; ULTRALUBE E340 paraffin wax emulsion and ULTRA-LUBE E668H PP wax emulsion both available from Keim-Additec; or mixtures thereof.

In one embodiment, paraffin wax emulsion is used. Preferably, the paraffin wax emulsion is a melted refined paraffin wax, or its blend with other materials. Paraffin wax typically has a melting temperature of 46° C. to 71° C. Solids of the paraffin wax emulsion can vary from 1% to 60% by weight or from 30% to 55% by weight. The pH of the wax emulsion can range from 6 to 10, typically 7.9 to 9.8, but is dependent on the process used. Particle size of the paraffin wax emulsion can vary between 0.02 to 1.5 microns. The paraffin wax emulsion useful in the present invention can be prepared by melting refined paraffin wax to a temperature above the melting point of the paraffin. Appropriate emulsifiers, such as stearic acid, oleic acid, diethylamine ethanol, 2-amino-2-methyl-1-propanol, can then be added into the molten wax and water mixture with agitation at elevated temperatures. A base, such as potassium hydroxide or ammonium hydroxide, can then be dissolved in ethylene glycol or water at elevated temperatures and slowly added to the resultant mixture while increasing the speed of agitation. After all the water/base mixture has been added to the molten wax, the resulting wax in water emulsion can be passed through a homogenizer to further adjust particle size of the wax emulsion. After homogenization, the resulting wax emulsion is cooled, for example, through a heat exchanger, and then filtered and packaged.

The aqueous coating composition of the present invention may comprise, based on the dry weight of the emulsion polymer, 1% by solids weight or more, 2% by solids weight or more, or even 4% by solids weight or more, and at the same time, 10% by solids weight or less, 8% by solids weight or less, or even 6% by solids weight or less, of the wax emulsion.

The aqueous coating composition of the present invention may also comprise one or more pigments. As used herein, the term "pigment" refers to a particulate inorganic material which is capable of materially contributing to the opacity or hiding capability of a coating. Such materials typically have a refractive index greater than 1.8 and include inorganic pigments and organic pigments. Examples of suitable inorganic pigments include titanium dioxide ($TiO_2$), zinc oxide, zinc sulfide, iron oxide, barium sulfate, barium carbonate, or mixtures thereof. Preferred pigment used in the present invention is $TiO_2$. $TiO_2$ may be also available in concentrated dispersion form.

The aqueous coating composition of the present invention may also comprise one or more extenders. The term "extender" refers to a particulate inorganic material having a refractive index of less than or equal to 1.8 and greater than 1.3. Examples of suitable extenders include calcium carbonate, aluminium oxide ($Al_2O_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. The aqueous coating composition may have a pigment volume concentration (PVC) of from 45% to 85%, from 55% to 80%, from 55% to 75%, or from 60% to 70%. PVC of a coating composition may be determined according to the following equation:

$$PVC(\%) = \frac{\text{volume of pigment(s)} + \text{volume of extender(s)}}{\text{total dry volume of coating}}$$

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO Airex 902 W and TEGO Foamex 1488 polyether siloxane copolymer emulsions both available from TEGO, BYK-024 silicone deformer available from BYK, or mixtures thereof. The defoamer may be present, based on the total weight of the aqueous coating composition, in an amount of generally from 0 to 10% by weight, from 0.01% to 8% by weight, or from 0.1% to 5% by weight.

The aqueous coating composition of the present invention may further comprise one or more thickeners, also known as "rheology modifiers". The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is a hydrophobically-modified hydroxy ethyl cellulose (HMHEC). The thickener may be present, based on the total weight of the aqueous coating composition, in an amount of generally from 0 to 2.5% by weight, from 0.01% to 2% by weight, or from 0.1% to 1.5% by weight.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. Suitable commercially available wetting agents include, for example, SURFYNOL 10 nonionic wetting agent based on an actacetylenic diol available from Air Products, BYK-346 and BYK-349 polyether-modified siloxanes both available from BYK, or mixtures thereof. The wetting agent may be present, based on the total weight of the aqueous coating composition, in an amount of from 0 to 1% by weight, from 0.01% to 0.2% by weight, or from 0.02% to 0.1% by weight.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescent may be present, based on the total weight of the aqueous coating composition, in an amount of from 0 to 5% by weight, from 0.1% to 3% by weight, or from 0.2% to 2% by weight.

The aqueous coating composition of the present invention may further comprise one or more dispersants. The dispersants may include non-ionic, anionic and cationic dispersants such as polyacids with suitable molecular weight, 2-amino-2-methyl-1-propanol (AMP), dimethyl amino ethanol (DMAE), potassium tripolyphosphate (KTPP), trisodium polyphosphate (TSPP), citric acid and other carboxylic acids. The polyacids used may include homopolymers and copolymers based on polycarboxylic acids, including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers; salts of thereof; or mixtures thereof. The molecular weight of such polyacids may be in the range of from 1,000 to 50,000, from 1,200 to 40,000, from 1,500 to 20,000, from 2,000 to 15,000, or from 2,500 to 10,000, as measured by Gel Permeation Chromatography (GPC) (column: One PLgel GUARD columns (10 μm, 50×7.5 mm) andOne Mixed B columns (7.8×300 mm) in tandem; and calibration: PL Polystyrene Narrow standards with molecular weights ranging from 2329000 to 580 g/mol, using polynom 3 fitness). The dispersant may be present, based on the total weight of the aqueous coating composition, in an amount of from 0 to 5% by weight, from 0.1% to 4% by weight, or from 0.3% to 3% by weight.

In addition to the components described above, the aqueous coating composition of the present invention may further comprise any one or combination of the following additives: buffers, neutralizers, humectants, mildewcides, biocides, anti-skinning agents, colorants, flowing agents, crosslinkers, anti-oxidants, plasticizers, leveling agents, thixotropic agents, adhesion promoters, and grind vehicles. When present, these additives may be present in a combined amount of from 0.05% to 5% by weight or from 0.1% to 2% by weight, based on the total weight of the aqueous coating composition.

The aqueous coating composition of the present invention may further comprise water. The concentration of water may be, by weight based on the total weight of the coating composition, from 30% to 90%, from 40% to 80%, or from 50% to 70%.

The aqueous coating composition of the present invention may be prepared by admixing the emulsion polymer, the wax emulsion, the pigment, and optionally, other components as described above. Components in the coating composition may be mixed in any order to provide the aqueous coating composition of the present invention. Any of the above-mentioned optional components may also be added to the composition during or prior to the mixing to form the aqueous coating composition. The pigments and/or extenders are preferably mixed with the dispersant to form a slurry of pigments and/or extender.

The aqueous coating composition of the present invention can provide a coating obtained therefrom with good hydrophilic stain repellency, even when the aqueous coating composition has a PVC as high as 55% or higher, or even 60% or higher (also called "high PVC aqueous coating composition"). "Good hydrophilic stain repellency" or "improved hydrophilic stain repellency" used in the present invention refers to a coating or a coated substrate that achieves a hydrophilic stain repellency score of 7 or higher, as measured by the test method described in Examples section below.

A process of using the aqueous coating composition of the present invention may comprise the following: applying the aqueous coating composition to a substrate, and drying, or allowing to dry, the applied coating composition.

The present invention also provides a method of preparing a coating. The method may comprise: forming the aqueous coating composition of the present invention, applying the aqueous coating composition to a substrate, and drying, or allowing to dry, the applied aqueous coating composition to form the coating.

The present invention also relates to a method of improving hydrophilic stain repellency of a substrate. The method comprises forming the aqueous coating composition, applying the aqueous coating composition to a substrate, and drying, or allowing to dry the aqueous coating composition, wherein the coated substrate has improved hydrophilic stain repellency.

The aqueous coating composition of the present invention can be applied to a substrate by incumbent means including brushing, dipping, rolling and spraying. The aqueous composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used.

The aqueous coating composition of the present invention can be applied to, and adhered to, various substrates. Examples of suitable substrates include wood, metals, plastics, foams, stones, elastomeric substrates, glass, wall paper, fabrics, medium-density fiberboard (MDF), particle board, gypsum board, concrete, or cementious substrates. The aqueous coating composition is particularly suitable to be used as a high PVC aqueous coating composition with improved hydrophilic stain repellency.

After the aqueous coating composition of the present invention has been applied to a substrate, the coating composition can dry, or allow to dry, to form a film (this is, coating) at room temperature (20-25° C.), or at an elevated temperature, for example, from 35° C. to 60° C. The coating composition can be used alone, or in combination with other coatings to form multi-layer coatings.

EXAMPLES

Some embodiments of the invention will now be described in the following Examples, wherein all parts and percentages are by weight unless otherwise specified.

Phosphoethyl methylacrylate ("PEM") is available from The Dow Chemical Company.

Butyl acrylate ("BA"), styrene ("ST"), methyl methacrylate ("MMA"), and acrylic acid ("AA") are all available from Shanghai LangYuan Chemical Co., Ltd.

Ethylene diamine tetraacetic acid disodium salt ("EDTA"), ammonium persulphate ("APS"), sodium hydroxide ("NaOH"), sodium styrene sulfonate ("SSS"), sodium bisulfite ("SBS"), dodecyl mercaptan ("nDDM"), propylene glycol and ethylene glycol are all available from Shanghai Chemical Reagent Co. Ltd.

MAXEMUL 6112 surfactant is a phosphorous-containing reactive surfactant available from Croda Company.

DISPONIL FES 32 anionic surfactant, available from BASF Company, is a fatty alcohol ether sulphate.

AMP-95™ base, available from The Dow Chemical Company, is 2-amino-2-methyl-1-propanol (AMP-95 is a trademark of The Dow Chemical Company).

ROPAQUE™ Ultra E opaque polymer is available from The Dow Chemical Company (ROPAQUE is a trademark of The Dow Chemical Company).

TRITON™ EF-106 surfactant, available from The Dow Chemical Company, is a nonionic, octylphenol ethoxylate surfactant (TRITON is a trademark of The Dow Chemical Company).

OROTAN™ CA-2500 hydrophobic dispersant is available from The Dow Chemical Company (OROTAN is a trademark of The Dow Chemical Company).

KATHON™ LXE Biocide is used as a preservative available from The Dow Chemical Company (KATHON is a trademark of The Dow Chemical Company).

FOAMASTER NXZ defoamer is available from BASF.

DB-80 extender is calcined kaolin available from Jinyang Gaoling Ltd. Co. (China).

NATROSOL 250 HBR hydroxyethylcellulose, available from Ashland Aqualon Company, is used as thickener.

TI-PURE R-706 titanium dioxide ($TiO_2$), available from DuPont Company, is used as a pigment.

CC-700 extender is calcium carbonate available from Guangfu Building Materials Group (China).

TEXANOL ester alcohol, available from Eastman Company, is used as a coalescent.

ULTRALUBE E-340 wax emulsion, available from Keim-Additec Company, is a paraffin wax emulsion.

The following standard analytical equipment and methods are used in the Examples.

Hydrophilic Stain Repellency

Hydrophilic stain repellency evaluates the difficulty of wetting a coating surface with hydrophilic stains. To determine the hydrophilic stain repellency, test coating compositions were casted on Leneta P-121-10N black vinyl charts and dried at 25° C. for 7 days. The coated charts were kept vertically so that hydrophilic stain drops (e.g., water) were allowed to flow from the upper to the bottom side of the coated surface of the charts. Hydrophilic stain repellency was observed by the naked eye and hydrophilic stain repellency was represented by the hydrophilic stain repellency scores shown in Table 1 below. The hydrophilic stain repellency score of 7 or higher indicates that coating films have good hydrophilic stain repellency. Otherwise, if the hydrophilic stain repellency score lower than 7, the coating films have poor hydrophilic stain repellency.

TABLE 1

| | Hydrophilic stain repellency |
|---|---|
| Score | State |
| 10 | No wetting nor adhesion of stain droplets observed on the coating surface |
| 8 | ⅓ wetting area observed by individual small circular stain droplets on the coating surface |
| 7 | ½ wetting area observed by individual small circular stain droplets on the coating surface |
| 6 | ¾ wetting area observed by individual small circular stain droplets on the coating surface |
| 5 | Wetting observed by individual small circular stain droplets on the coating surface |
| 4 | Wetting observed by individual small elliptic hydrophilic stain droplets on the coating surface |
| 3 | Wetting observed by individual large hydrophilic stain droplets on the coating surface |
| 2 | Wetting observed along the discrete track of hydrophilic stains on the coating surface |
| 1 | Wetting observed along the thinner track of hydrophilic stains on the coating surface |
| 0 | Wetting observed along the entire track of hydrophilic stains on coating surface |

Preparation for Binder-1

A monomer emulsion was prepared by combining 452.64 g of BA, 324.9 g of ST, 2.67 g of SSS, 0.8 g of nDDM, 241.84 g of deionized (DI) water, and 127.66 g of MAXEMUL 6112 surfactant (18.8% aqueous solution), and emulsified with stirring.

Then, 1.25 g of DISPONIL FES 32 anionic surfactant (31% aqueous solution) and 430 g of DI water were charged to a five-liter multi-neck flask fitted with mechanical stirring. The materials in the flask were heated to 90° C. under nitrogen atmosphere. To the stirred flask, 47.43 g of the monomer emulsion obtained above was added followed by 0.01 g of ferrous sulfate mixed with 0.005 g of EDTA in 3.24 g of DI water, and then 2.91 g of APS in 8.51 g of DI water was added. The remaining monomer emulsion and 1.16 g of APS in 31.55 g of DI water, 1.23 g of SBS in 31.55 g of DI water as well as 3.6 g of NaOH in 60 g of DI water were then added to the flask respectively over a period of 120 minutes while the reactor temperature was maintained at 88° C. Then, 11 g of DI water was used to rinse the emulsion feed line to the flask. The reaction mixture was then cooled down to room temperature. During cooling, 2.42 g of t-butyl hydroperoxide (70%) and 1.21 g of isoascorbic acid in aqueous solutions were added into the flask. AMP-95 was added to neutralize the obtained dispersion to a pH of 7.0 to 8.0. Finally, KATHON LXE biocide was added to the binder dispersion before packaged.

Synthesis of Binders 2 to 6 and Binders A to F

Binder-2 through 6 and Binder-A through F, respectively, were prepared according to the same procedure as described above in preparing Binder-1, based on different monomer emulsion compositions as given in Table 2. Properties of the obtained binders are also given in Table 2.

TABLE 2

| | Binder Composition* | | | | | | Properties of Binders | | |
|---|---|---|---|---|---|---|---|---|---|
| | BA, % | ST, % | SSS, % | AA, % | PEM, % | MAXEMUL 6112, % | nDDM, % | pH | Particle size**, nm | Solids, % |
| Binder-A | 56 | 40.2 | 0.3 | 0 | 0 | 3.4 | 0.1 | 7.8 | 142.9 | 43.8 |
| Binder-B | 56 | 40.2 | 0.3 | 0 | 3.4 | 0 | 0.1 | 7.6 | 135.1 | 45.3 |
| Binder-1 | 56 | 40.2 | 0.3 | 0 | 0.34 | 3.06 | 0.1 | 7.6 | 142.9 | 43.8 |
| Binder-2 | 56 | 40.2 | 0.3 | 0 | 1.4 | 2 | 0.1 | 7.5 | 134 | 45.8 |
| Binder-C | 56 | 40.2 | 0.3 | 0 | 3.06 | 0.34 | 0.1 | 7.4 | 146.9 | 46.6 |
| Binder-D | 56 | 41.6 | 0.3 | 0 | 0 | 2 | 0.1 | 7.6 | 165 | 47.1 |
| Binder-E | 56 | 41.6 | 0.3 | 0 | 2 | 0 | 0.1 | 7.7 | 149.3 | 45.6 |
| Binder-3 | 56 | 41.6 | 0.3 | 0 | 0.7 | 1.3 | 0.1 | 7.5 | 186 | 46.22 |
| Binder-4 | 56 | 41.6 | 0.3 | 0 | 1.4 | 0.6 | 0.1 | 7.9 | 134.5 | 44.90 |
| Binder-5 | 56 | 41.6 | 0.3 | 0 | 0.2 | 1.8 | 0.1 | 7.8 | 149.8 | 44.37 |
| Binder-F | 56 | 39.8 | 0.3 | 2 | 0.18 | 1.62 | 0.1 | 7.6 | 181.9 | 44.67 |
| Binder-6 | 56 | 41 | 0.3 | 0 | 0.3 | 2.3 | 0.1 | 7.3 | 137.1 | 44.7 |

*% by weight based on the dry weight of the binder
**Particle size was measured by BrookHaven BI-90 equipment.

Examples (Exs) 1-6 and Comparative (Comp) Exs A-F Coating Composition

Coating compositions were prepared based on formulations listed in Table 3. The as prepared binders were used for preparing each coating composition, according to formulations given in Table 3. Ingredients for grind were mixed using a high speed Cowles disperser. Then ingredients for letdown were added and mixed by a conventional agitator. The obtained coating compositions (PVC: 63%) were tested for hydrophilic stain repellency according to the test method described above and results are given in Table 4.

TABLE 3

| Coating Composition | gram |
|---|---|
| Grind | |
| Water | 200.0 |
| propylene glycol | 12.0 |
| TRITON EF-106 wetting agent | 2.0 |
| FOAMASTER NXZ defoamer | 1.0 |
| OROTAN CA-2500 dispersant | 13.1 |
| NATROSOL 250 HBR rheology modifier | 4.0 |
| AMP-95 base | 1.0 |
| TI-PURE R-706 TiO₂ | 130.0 |
| CC-700 extender | 120.0 |
| DB-80 extender | 80.0 |
| Letdown | |
| Binder | 209.9 |
| TEXANOL coalescent | 8.0 |
| ROPAQUE Ultra E opaque polymer | 80.0 |
| FOAMASTER NXZ defoamer | 1.0 |
| AMP-95 base | 2.0 |
| ULTRALUBE E-340 wax emulsion | 10.0 |
| Water | 126 |
| Total | 1000.0 |

Table 4 gives hydrophilic stain properties of coating films made from the coating compositions. As shown in Table 4, Binder-A, Binder-B, Binder-D and Binder-E comprising polymerized units of one type of phosphorus-containing monomers all provided coatings with poor hydrophilic stain repellency (Comp Exs A, B, D and E). Binder-C comprised polymerized units of PEM and phosphorous-containing surfactant but at a ratio of 0.9 (PEM/total phosphorous-containing monomers). The coating composition comprising Binder-C provided coatings with poor hydrophilic stain repellency (Comp Ex C). Binder-F comprising, as polymerized units, 2% by weight of AA and 1.8% by weight of phosphorous-containing monomers provided coatings with poor hydrophilic stain repellency (Comp Ex F). In contrast, the coating compositions of Exs 1-6 all provided coating films with better hydrophilic stain repellency than those of Comp Exs A-E.

TABLE 4

| | Binder | Total phosphorous-containing monomers*, % | Weight ratio (PEM/Total phosphorous-containing monomers) | Hydrophilic stain repellency score |
|---|---|---|---|---|
| Comp Ex A | Binder-A | 3.4 | 0 | 6 |
| Comp Ex B | Binder-B | 3.4 | 1 | 4 |
| Ex 1 | Binder-1 | 3.4 | 0.1 | 9 |
| Ex 2 | Binder-2 | 3.4 | 0.4 | 10 |
| Comp Ex C | Binder-C | 3.4 | 0.9 | 4 |
| Comp Ex D | Binder-D | 2 | 0 | 4 |
| Comp Ex E | Binder-E | 2 | 1 | 6 |
| Ex 3 | Binder-3 | 2 | 0.4 | 7 |
| Ex 4 | Binder-4 | 2 | 0.7 | 8 |
| Ex 5 | Binder-5 | 2 | 0.1 | 9 |
| Comp Ex F | Binder-F | 1.8 | 0.1 | 4 |
| Ex 6 | Binder-6 | 2.6 | 0.1 | 8 |

*% by weight based on the dry weight of the binder.

What is claimed is:

1. An aqueous coating composition comprising:
   (A) an emulsion polymer comprising as polymerized units, based on the dry weight of the emulsion polymer,
   (i) from 1.9% to 3.5% by weight of phosphorous-containing monomers, wherein the phosphorous-containing monomers comprise,
      (a) a phosphorous-containing (meth)acrylate, and
      (b) a phosphorous-containing surfactant or a salt thereof, wherein the phosphorous-containing surfactant has the structure of formula (I), $$R-O-(C_mH_{2m}O)_n-PO_3H_2 \qquad (I),$$

wherein R is a $C_8$-$C_{22}$ branched or linear alkenyl group, m is an integer of from 2 to 4, and n is an integer of from 3 to 40; and
   wherein the weight ratio of phosphorous-containing (meth)acrylate to total phosphorous-containing monomers is in the range of 0.1 to 0.8; and (ii) from 0 to 1% by weight of an ethylenically unsaturated ionic monomer carrying at least one functional group selected from carboxyl, carboxylic anhydride, sulphonate, phosphonate, or combinations thereof;

(B) a wax emulsion in an amount of from 1% to 10% by solids weight, based on the dry weight of the emulsion polymer; and (C) a pigment.

2. The aqueous coating composition of claim 1, wherein the pigment is present at a pigment volume concentration of from 45% to 85%.

3. The aqueous coating composition of claim 1, wherein R in formula (I) is a $C_{10}$-$C_{18}$ branched or linear alkenyl group.

4. The aqueous coating composition of claim 1, wherein the emulsion polymer has a glass transition temperature of from 0 to 25° C.

5. The aqueous coating composition of claim 1, wherein the phosphorous-containing (meth)acrylate is selected from the group consisting of phosphoethyl (meth)acrylate, phosphopropyl (meth)acrylate, and phosphobutyl (meth)acrylate.

6. The aqueous coating composition of claim 1, wherein the emulsion polymer comprises as polymerized units, based on the dry weight of the emulsion polymer, from 2.2% to 3.0% by weight of the phosphorous-containing monomers; and the weight ratio of phosphorous-containing (meth)acrylate to total phosphorous-containing monomers is in the range of from 0.4 to 0.6.

7. The aqueous coating composition of claim 1, wherein the emulsion polymer further comprises, as polymerized units, butyl acrylate, styrene, methyl methacrylate, methacrylic acid, acrylic acid, sodium styrene sulfonate, or mixtures thereof.

8. The aqueous coating composition of claim 1, wherein the wax emulsion is a paraffin wax emulsion.

9. The aqueous coating composition of claim 1, wherein the wax emulsion is present in an amount of from 2% to 8% by solids weight, based on the dry weight of the emulsion polymer.

10. A method of improving hydrophilic stain repellency of a substrate comprising:
forming the aqueous coating composition of claim 1,
applying the aqueous coating composition to a substrate, and
drying, or allowing to dry the aqueous coating composition, wherein the coated substrate has improved hydrophilic stain repellency.

11. The aqueous coating composition of claim 1, wherein the emulsion polymer comprises (i) from 2.2% to 3.0% by weight of phosphorous-containing monomers.

12. The aqueous coating composition of claim 1, wherein a coating film made from the aqueous coating composition exhibits a hydrophilic stain repellency of 7 or above.

* * * * *